(12) United States Patent
Newman et al.

(10) Patent No.: US 8,676,684 B2
(45) Date of Patent: Mar. 18, 2014

(54) SYSTEM AND METHOD FOR EVALUATING RISK IN FRAUD PREVENTION

(75) Inventors: Jim Newman, Portland, OR (US); Bart Lonchar, Portland, OR (US); Scott Waddell, Lake Oswego, OR (US)

(73) Assignee: iovation Inc., Portland, OR (US)

( * ) Notice: Subject to any disclaimer, the term of this patent is extended or adjusted under 35 U.S.C. 154(b) by 0 days.

(21) Appl. No.: 13/085,418

(22) Filed: Apr. 12, 2011

(65) Prior Publication Data

US 2012/0030083 A1    Feb. 2, 2012

Related U.S. Application Data

(60) Provisional application No. 61/323,184, filed on Apr. 12, 2010.

(51) Int. Cl.
*G06Q 40/00*    (2012.01)

(52) U.S. Cl.
USPC ............................................................ 705/35

(58) Field of Classification Search
None
See application file for complete search history.

(56) References Cited

U.S. PATENT DOCUMENTS

| | | | |
|---|---|---|---|
| 5,337,357 A | 8/1994 | Chou et al. | |
| 5,696,824 A | 12/1997 | Walsh | |
| 5,819,226 A | 10/1998 | Gopinathan et al. | |
| 5,838,306 A | 11/1998 | O'Connor et al. | |
| 5,903,478 A | 5/1999 | Fintel et al. | |
| 6,026,166 A | 2/2000 | LeBourgeois | |
| 6,108,790 A | 8/2000 | Moriya et al. | |
| 6,148,407 A | 11/2000 | Aucsmith | |
| 6,222,547 B1 | 4/2001 | Schwuttke et al. | |
| 6,243,468 B1 | 6/2001 | Pearce et al. | |
| 6,263,376 B1 | 7/2001 | Hatch et al. | |
| 6,324,267 B1 | 11/2001 | Hraster et al. | |

(Continued)

FOREIGN PATENT DOCUMENTS

| | | |
|---|---|---|
| CA | 2570045 | 12/2005 |
| CA | 2667279 | 10/2008 |

(Continued)

OTHER PUBLICATIONS

Keefe et al.; E-Mail Scam Cites Bogus 'Fraud Alert' from Best Buy, Palm Beach Post; Section 6A; Jun. 21, 2003; (Abstract only).*

(Continued)

*Primary Examiner* — Virpi Kanervo
(74) *Attorney, Agent, or Firm* — Davis Wright Tremaine LLP; Heather M. Colburn

(57) ABSTRACT

A method of determining a risk score indicating a risk that an electronic transaction will involve fraud and/or abuse. The method includes receiving transaction data associated with a not yet completed transaction from a merchant. The transaction data includes one or more characteristics related to the transaction. A profile is selected that identifies network devices each associated with the characteristics and having a device reputation. Next, a profile-based risk factor is determined as a function of a percentage of the network devices having a negative reputation. The risk score is determined as a function of the profile-based risk factor. In some embodiments, a transaction-based risk factor may also be determined. In such embodiments, the risk score is determined as a function of the profile-based and transaction-based risk factors. The risk score is provided to the merchant to be used thereby to determine whether to proceed with the transaction.

24 Claims, 6 Drawing Sheets

(56) References Cited

U.S. PATENT DOCUMENTS

| | | | |
|---|---|---|---|
| 6,418,472 B1 | 7/2002 | Mi et al. | |
| 6,425,085 B2 | 7/2002 | Hashikura | |
| 6,442,696 B1 | 8/2002 | Wray et al. | |
| 6,449,645 B1 | 9/2002 | Nash | |
| 6,460,140 B1 | 10/2002 | Schoch et al. | |
| 6,569,205 B1 | 5/2003 | Poggi | |
| 6,571,339 B1 | 5/2003 | Danneels et al. | |
| 6,856,963 B1 | 2/2005 | Hurwitz | |
| 6,868,525 B1 | 3/2005 | Szabo | |
| 6,914,968 B1 | 7/2005 | Ryley et al. | |
| 6,928,558 B1 | 8/2005 | Allahwerdi et al. | |
| 7,024,177 B2 | 4/2006 | Bhasin et al. | |
| 7,047,414 B2 | 5/2006 | Wheeler et al. | |
| 7,210,169 B2 | 4/2007 | Smith et al. | |
| 7,231,657 B2 | 6/2007 | Honarvar et al. | |
| 7,263,506 B2 | 8/2007 | Lee et al. | |
| 7,272,728 B2 | 9/2007 | Pierson et al. | |
| 7,310,780 B2 | 12/2007 | Diering et al. | |
| 7,373,515 B2 | 5/2008 | Owen et al. | |
| 7,403,922 B1 | 7/2008 | Lewis et al. | |
| 7,529,731 B2 | 5/2009 | Bier | |
| 7,562,058 B2* | 7/2009 | Pinto et al. | 706/21 |
| 7,610,617 B2 | 10/2009 | Kelly et al. | |
| 7,685,206 B1 | 3/2010 | Mathew et al. | |
| 7,882,121 B2 | 2/2011 | Bruno | |
| 7,908,645 B2 | 3/2011 | Varghese et al. | |
| 2001/0044896 A1 | 11/2001 | Schwartz et al. | |
| 2002/0035622 A1 | 3/2002 | Barber | |
| 2002/0059130 A1 | 5/2002 | Cheng | |
| 2002/0073046 A1 | 6/2002 | David | |
| 2002/0111996 A1 | 8/2002 | Jones et al. | |
| 2002/0111998 A1 | 8/2002 | Kim | |
| 2002/0120726 A1 | 8/2002 | Padole et al. | |
| 2002/0143862 A1 | 10/2002 | Peterson | |
| 2002/0147000 A1 | 10/2002 | Holmes-Kinsella | |
| 2002/0162029 A1 | 10/2002 | Allen et al. | |
| 2002/0188556 A1* | 12/2002 | Colica et al. | 705/38 |
| 2003/0005287 A1 | 1/2003 | Wray et al. | |
| 2003/0028762 A1 | 2/2003 | Trilli et al. | |
| 2003/0163708 A1 | 8/2003 | Tang | |
| 2003/0182421 A1 | 9/2003 | Faybishenko et al. | |
| 2004/0049587 A1 | 3/2004 | Henaff et al. | |
| 2004/0148525 A1 | 7/2004 | Aida et al. | |
| 2004/0158574 A1 | 8/2004 | Tom et al. | |
| 2004/0172561 A1 | 9/2004 | Iga | |
| 2004/0215788 A1 | 10/2004 | Morris | |
| 2004/0230831 A1 | 11/2004 | Spelman et al. | |
| 2004/0236702 A1 | 11/2004 | Fink et al. | |
| 2004/0242200 A1 | 12/2004 | Maeoka et al. | |
| 2004/0243802 A1 | 12/2004 | Jorba | |
| 2005/0022020 A1 | 1/2005 | Fremberg | |
| 2005/0033833 A1 | 2/2005 | Baldiga et al. | |
| 2005/0044385 A1 | 2/2005 | Holdsworth | |
| 2005/0075992 A1 | 4/2005 | Gavan et al. | |
| 2005/0114530 A1 | 5/2005 | Mangalik et al. | |
| 2005/0138362 A1 | 6/2005 | Kelly et al. | |
| 2005/0166053 A1 | 7/2005 | Cui et al. | |
| 2005/0182660 A1 | 8/2005 | Henley | |
| 2005/0268107 A1 | 12/2005 | Harris et al. | |
| 2005/0273442 A1 | 12/2005 | Bennett et al. | |
| 2006/0004558 A1 | 1/2006 | Bankes | |
| 2006/0010072 A1 | 1/2006 | Eisen | |
| 2006/0026692 A1 | 2/2006 | Lakhani | |
| 2006/0053095 A1 | 3/2006 | Koch et al. | |
| 2006/0069697 A1 | 3/2006 | Shraim et al. | |
| 2006/0080536 A1 | 4/2006 | Teppler | |
| 2006/0129835 A1 | 6/2006 | Ellmore | |
| 2006/0200855 A1 | 9/2006 | Willis | |
| 2006/0235796 A1 | 10/2006 | Johnson et al. | |
| 2007/0011724 A1 | 1/2007 | Gonzalez et al. | |
| 2007/0073630 A1 | 3/2007 | Greene et al. | |
| 2007/0113090 A1 | 5/2007 | Villela | |
| 2008/0020738 A1 | 1/2008 | Ho et al. | |
| 2008/0052091 A1 | 2/2008 | Vawter | |
| 2008/0059380 A1 | 3/2008 | Bleahen | |
| 2008/0063161 A1 | 3/2008 | Joyce et al. | |
| 2008/0065892 A1 | 3/2008 | Bailey et al. | |
| 2008/0083017 A1 | 4/2008 | Lulich et al. | |
| 2008/0104070 A1 | 5/2008 | Lonchar et al. | |
| 2008/0104672 A1 | 5/2008 | Lunde et al. | |
| 2008/0104684 A1 | 5/2008 | Lunde et al. | |
| 2008/0167888 A1 | 7/2008 | Keithley | |
| 2008/0167966 A1 | 7/2008 | Ramsdale et al. | |
| 2008/0174603 A1 | 7/2008 | Brass et al. | |
| 2008/0281733 A1 | 11/2008 | Kubo et al. | |
| 2008/0288405 A1 | 11/2008 | John | |
| 2008/0318548 A1 | 12/2008 | Bravo et al. | |
| 2009/0006861 A1 | 1/2009 | Bemmel | |
| 2009/0013399 A1 | 1/2009 | Cottrell et al. | |
| 2009/0031131 A1 | 1/2009 | Qiu et al. | |
| 2009/0089869 A1 | 4/2009 | Varghese | |
| 2009/0119194 A1 | 5/2009 | Chau et al. | |
| 2009/0134215 A1 | 5/2009 | Drummond et al. | |
| 2009/0259588 A1 | 10/2009 | Lindsay | |
| 2009/0265198 A1 | 10/2009 | Lester et al. | |
| 2009/0271306 A1 | 10/2009 | Pierson | |
| 2010/0269168 A1 | 10/2010 | Hegli et al. | |
| 2011/0022483 A1* | 1/2011 | Hammad | 705/17 |
| 2011/0295722 A1 | 12/2011 | Reisman | |

FOREIGN PATENT DOCUMENTS

| | | |
|---|---|---|
| CN | 1353383 | 6/2002 |
| CN | 1469583 | 1/2004 |
| GB | 2420192 | 5/2006 |
| JP | 2007-052688 | 3/2007 |
| JP | 2007-087079 | 4/2007 |
| KR | 10-2006-0060521 | 6/2006 |
| WO | 99/66378 | 12/1999 |
| WO | 2005125073 | 12/2005 |
| WO | 2008042871 | 4/2008 |
| WO | 2008052128 | 5/2008 |
| WO | 2008052132 | 5/2008 |
| WO | 2008082672 | 7/2008 |
| WO | 2008130440 | 10/2008 |
| WO | 2009134941 | 11/2009 |

OTHER PUBLICATIONS

Gordon, Marcy; SEC Beefing Up Internet Surveillance—Automated System to Search for Telltale Words, Phrases that Could Indicate Fraud; Journal Star [Peoria, Ill.]; Section A07; Mar. 29, 2000.*

Flaim, Denise; The E-Shopper/If Security Fails, Disaster Isn't Always in the Cards; Newsday [Long Island, N.Y.]; Section C07; May 23, 2001.*

U.S. Appl. No. 11/840,124, filed Aug. 16, 2007: Non-Final Office Action dated Aug. 27, 2009, 4 pages.

U.S. Appl. No. 11/840,124, filed Aug. 16, 2007: Non-Final Office Action dated Aug. 17, 2010, 9 pages.

U.S. Appl. No. 11/840,124, filed Aug. 16, 2007: Restriction Requirement dated Mar. 5, 2010, 6 pages.

U.S. Appl. No. 11/840,124, filed Aug. 16, 2007: Final Office Actiondated Mar. 11, 2011, 18 pages.

U.S. Appl. No. 11/863,603, filed Sep. 28, 2007: Non-Final Office Action dated Jun. 17, 2008, 8 pages.

U.S. Appl. No. 11/863,603, filed Sep. 28, 2007: Notice of Allowance dated Dec. 16, 2008, 6 pages.

U.S. Appl. No. 11/923,561, filed Oct. 24, 2007: Advisory Action dated Jun. 8, 2011, 3 pages.

U.S. Appl. No. 11/923,561, filed Oct. 24, 2007: Non-Final Office Action dated Jan. 19, 2012, 16 pages.

U.S. Appl. No. 11/923,561, filed Oct. 24, 2007: Final Office Action dated Aug. 16, 2012, 13 pages.

U.S. Appl. No. 11/923,561, filed Oct. 24, 2007: Non-Final Office Action dated Sep. 15, 2010, 10 pages.

U.S. Appl. No. 11/923,561, filed Oct. 24, 2007: Final Office Action dated Mar. 30, 2011, 10 pages.

U.S. Appl. No. 11/923,572, filed Dec. 26, 2007: Non-Final Office Action dated Sep. 10, 2010, 10 pages.

U.S. Appl. No. 11/923,572, filed Dec. 26, 2007: Final Office Action dated May 9, 2011, 14 pages.

(56) References Cited

OTHER PUBLICATIONS

U.S. Appl. No. 11/923,572, filed Dec. 26, 2007: Non-Final Office Action dated Jun. 4, 2012, 11 pages.
U.S. Appl. No. 11/923,572, filed Dec. 26, 2007: Final Office Action dated Mar. 1, 2013, 12 pages.
U.S. Appl. No. 11/923,572, filed Dec. 26, 2007: Notice of Allowance dated May 3, 2013, 10 pages.
U.S. Appl. No. 11/923,580, filed Oct. 24, 2007: Non-Final Office Action dated Feb. 24, 2010, 7 pages.
U.S. Appl. No. 11/923,580, filed Oct. 24, 2007: Final Office Action dated Dec. 13, 2010, 9 pages.
U.S. Appl. No. 11/923,580, filed Oct. 24, 2007: Non-Final Office Action dated Jun. 7, 2011, 10 pages.
U.S. Appl. No. 11/923,580, filed Oct. 24, 2007: Non-Final Office Action dated May 24, 2012, 8 pages.
U.S. Appl. No. 12/432,714, filed Apr. 29, 2009: Non-Final Office Action dated Mar. 30, 2011, 15 pages.
U.S. Appl. No. 12/432,714, filed Apr. 29, 2009: Final Office Action dated Nov. 28, 2011, 15 pages.
U.S. Appl. No. 13/230,508, filed Sep. 12, 2011: Restriction Requirement dated Aug. 9, 2012, 6 pages.
U.S. Appl. No. 13/230,508, filed Sep. 12, 2011: Non-Final Office Action dated Jan. 29, 2013, 15 pages.
U.S. Appl. No. 13/230,508, filed Sep. 12, 2011: Final Office Action dated Jul. 23, 2013, 17 pages.
U.S. Appl. No. 13/763,422, filed Feb. 8, 2013: Non-Final Office Action dated Aug. 16, 2013, 25 pages.
U.S. Patent Reexamination No. 90/011,499, flied Feb. 18, 2011: ReExam Final Rejection dated Feb. 17, 2012, 10 pages.
U.S. Patent Reexamination No. 90/011,499, filed Feb. 18, 2011: ReExam Non-Final Action dated Jul. 29, 2011, 11 pages.
U.S. Patent Reexamination No. 90/011,499, filed Feb. 18, 2011: Notice of Intent to Issue a ReExam dated May 21, 2011, 6 pages.
U.S. Patent Reexamination No. 90/011,499, filed Feb. 18, 2011: Determination-ReExam Ordered dated Apr. 29, 2011, 13 pages.
Yee, et al., "Passpet: Convenient Password Management and Phishing Protection," ACM 2006, SOUPS, 12 pages.
Information Disclosure Statement Transmittal Letter, filed herewith on Aug. 22, 2013, 2013, 2 pages.
Canadian Patent Application No. 2667233, Official Action issued by CIPO dated Mar. 25, 2011, 2 pages.
Canadian Patent Application No. 2667279, Official Action issued by CIPO dated Apr. 11, 2012, 3 pages.
Canadian Patent Application No. 2570045, Examiner's Report issued by CIPO dated Jan. 11, 2013, 2 pages.
Conti, et al., "Visual Exploration of Malcious Network Objects Using Semantic Zoom, Interactive Encoding and Dynamic Queries," IEEE, Workshop on Visualization for Computer Security, Oct. 26, 2005, pp. 83-90.
Chinese Patent Application No. 200580022148.4: Official Action issued from State Intellectual Property Office of The People's Republic of China on Oct. 9, 2010 with English translation attached thereto, 15 pages.
Chinese Patent Application No. 200580022148.4: Official Action issued from State Intellectual Property Office of The People's Republic of China on Mar. 8, 2010 with English translation attached thereto, 12 pages.
Chinese Patent Application No. 200580022148.4: Official Action issued from State Intellectual Property Office of The People's Republic of China on Jul. 3, 2009 with English translation attached thereto, 15 pages.
Chinese Patent Application No. 200580022148.4: Official Action issued from State Intellectual Property Office of The People's Republic of China on Oct. 8, 2008 with English translation attached thereto, 10 pages.
Chinese Patent Application No. 200580022148.4: Official Action issued from State Intellectual Property Office of The People's Republic of China on Aug. 12, 2011, 7 pages.
Chinese Office Action for Application Serial No. 2011080900572420 dated Aug. 12, 2011, 4 pages.

English Translation of CN 1353383 as provided to Davis Wright Tremaine by Chinese Agent, 18 pages.
English Translation of CN 1469583 as provided to Davis Wright Tremaine by Chinese Agent, 20 pages.
English Abstract of JP 2007-087079, obtained from espace.net on Jan. 6, 2011, 1 page.
English Abstract of JP 2007-052688, obtained from espace.net on Jan. 6, 2011, 1 page.
Eick, et al., "Visualizing Corporate Data," Jan. 1996, AT&T Technical Journal, pp. 1-25.
Eick, et al., "Visualizing Corporate Data," 1997, IEEE, pp. 6-11.
European Patent Convention Application No. 07844618.4: European Search Report issued from the European Patent Office on Apr. 9, 2010, 5 pages.
European Patent Convention Application No. 07844618.4: European Search Report issued from the European Patent Office on Mar. 30, 2010, 2 pages.
European Patent Convention Application No. 05758533.3: Official Action issued from the European Patent Office on Jun. 4, 2009, 10 pages.
European Patent Convention Application No. 05758533.3: European Search Report issued from the European Patent Office on Apr. 21, 2009, 2 pages.
International Patent Application No. PCT/US2007/082557: Written Opinion and International Preliminary Report on Patentability of the International Searching Authority dated Jun. 13, 2008, 4 pages.
International Patent Application No. PCT/US2007/082557: International Search Report dated Jun. 13, 2008, 2 pages.
International Patent Application No. PCT/US2005/021034: Written Opinion and International Preliminary Report on Patentability of the International Searching Authority dated Jun. 11, 2007, 4 pages.
International Patent Application No. PCT/US2005/021034: International Search Report dated Jun. 11, 2007, 2 pages.
International Patent Application No. PCT/US2005/026525: International Search Report dated Nov. 30, 2009, 3 pages.
International Patent Application No. PCT/US2005/026525: Written Opinion and International Preliminary Report on Patentability of the International Searching Authority dated Nov. 30, 2009, 5 pages.
International Patent Application No. PCT/US2007/080117: International Search Report dated Jul. 16, 2008, 3 pages.
International Patent Application No. PCT/US2007/080117: Written Opinion and Preliminary Report on Patentability of the International Searching Authority dated Jul. 16, 2008, 6 pages.
International Patent Application No. PCT/US2007/082553: International Search Report dated Jun. 24, 2008, 2 pages.
International Patent Application No. PCT/US2007/082553: Written Opinion and Preliminary Report on Patentability of the International Searching Authority dated Jun. 24, 2008, 4 pages.
International Patent Application No. PCT/US2007/082559: International Search Report dated Mar. 25, 2009, 3 pages.
International Patent Application No. PCT/US2007/082559: Written Opinion and International Preliminary Report on Patentability of the International Searching Authority dated Mar. 25, 2009, 4 pages.
International Patent Application No. PCT/US2009/042184: International Search Report dated Nov. 18, 2009, 3 pages.
International Patent Application No. PCT/US2009/042184:Written Opinion of International Search Authority dated Nov. 18, 2009, 3 pages.
International Patent Application No. PCT/US2009/042184: International Preliminary Report on Patentability dated Nov. 2, 2010, 3 pages.
List of Pending Claims for Chinese Patent Application No. 200580022148.4 filed Jun. 14, 2005, 7 pages.
Lising of Pending Claims for Japanese Application No. 2007/516658, which is the National phase of International Application No. PCT/US2005/021034,filed Jun. 14, 2005, 7 pages.
Livnat, et al., "A Visualization paradigm for Network Intrusion Detection," Jun. 2005, IEEE, pp. 30-37.
Notification for Patent Registration Formalities for Chinese Application No. 200580022148.4 dated Jan. 19, 2012, 4 pages.
Japanese Patent Application No. 2007-516658; Notice of Reasons for Rejection dated May 27, 2011, 3 pages.

(56) References Cited

OTHER PUBLICATIONS

Japanese Patent Application No. 2007-516658; Notice of Reasons for Rejection dated Jul. 12, 2012, 6 pages.

Pimpler, "Google Maps API—The New World of Web Mapping," Apr. 2006, Geospatial Training & Consulting, LLC, pp. 1-44.

U.S. Appl. No. 10/867,871, filed Jun. 14, 2004: Notice of Allowance dated Jul. 12, 2007, 4 pages.

U.S. Appl. No. 10/867,871, filed Jun. 14, 2004: Non-Final Office Action dated Mar. 23, 2007, 5 pages.

U.S. Appl. No. 11/058,846, filed Feb. 15, 2005: Non-Final Office Action dated Jun. 23, 2011, 24 pages.

U.S. Appl. No. 11/058,846, filed Feb. 15, 2005: Final Office Action dated Sep. 16, 2010, 25 pages.

U.S. Appl. No. 11/058,846, filed Feb. 15, 2005: Non-Final Office Action dated Mar. 19, 2010, 9 pages.

U.S. Appl. No. 11/058,846, filed Feb. 15, 2005: Restriction Requirement dated Jul. 8, 2009, 6 pages.

U.S. Appl. No. 11/058,846, filed Feb. 15, 2005: Non-Final Office Action dated Sep. 17, 2008, 17 pages.

U.S. Appl. No. 11/058,846, filed Feb. 15, 2005: Notice of Allowance dated Jun. 7, 2013, 9 pages.

Notice of Allowance issued in U.S. Appl. No. 11/058,846, dated Nov. 8, 2013.

Non-Final Office Action issued in U.S. Appl. No. 13/230,508, dated Dec. 19, 2013.

Examination Report issued in Canadian Patent Application No. 2667279, dated Nov. 15, 2013.

Notice of Allowance issued in U.S. Appl. No. 11/923,572, dated Jan. 7, 2014.

* cited by examiner

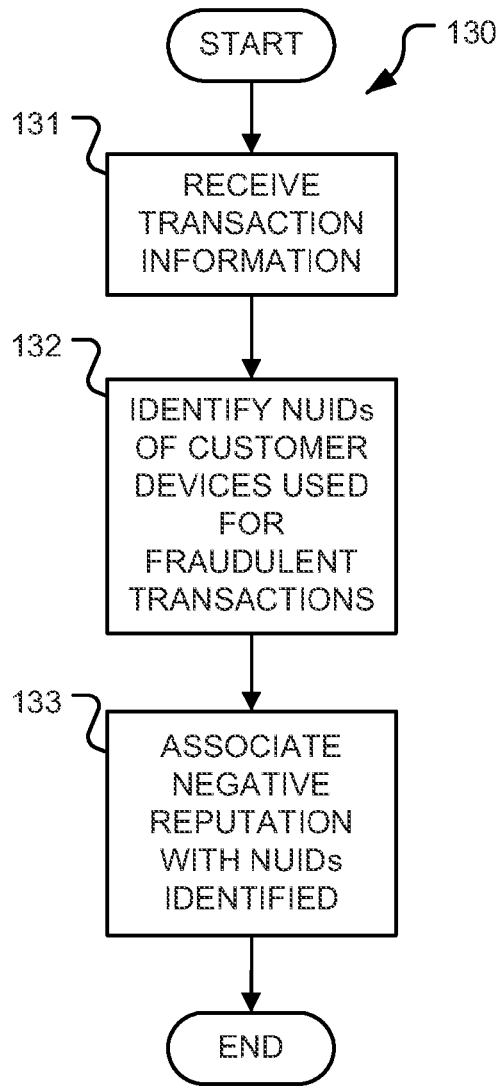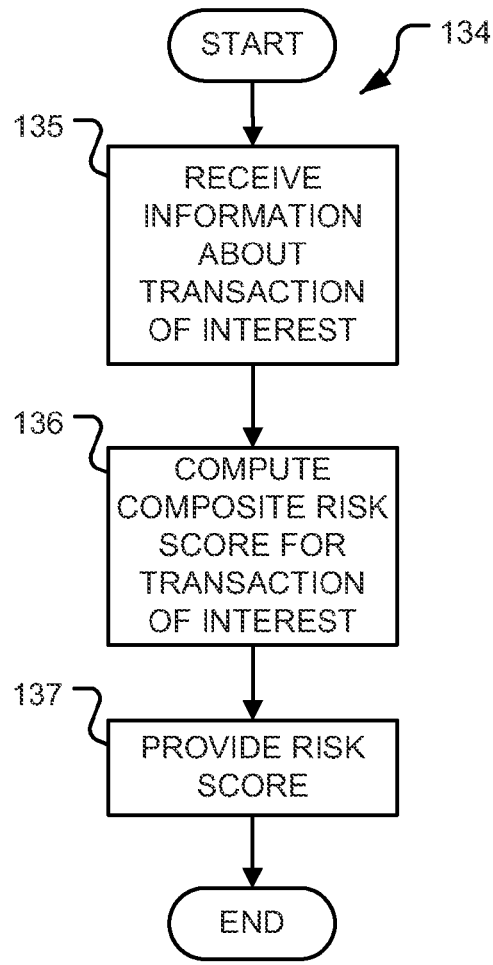
FIGURE 3
FIGURE 4

SYSTEM AND METHOD FOR EVALUATING RISK IN FRAUD PREVENTION

CROSS REFERENCE TO RELATED APPLICATION(S)

This application claims the benefit of U.S. Provisional Application No. 61/323,184, filed Apr. 12, 2010, which is incorporated herein by reference in its entirety.

BACKGROUND OF THE INVENTION

1. Field of the Invention

The present invention is directed generally to detecting and preventing fraud in network-based electronic commerce transactions, and more particularly to evaluating the risk of conducting a particular electronic commerce transaction.

2. Description of the Related Art

In a network-based electronic commerce (e-commerce) system, customers and merchants typically conduct transactions over a network, such as the Internet. The merchants and customers typically access the network via a network device such as, for example, a computer, a cell phone, a smart phone, a GPS device, or any other electronic device capable of accessing a data or telecommunications network. The merchants may include, for example, banks that offer on-line banking services, retailers that sell tangible products via the Internet, Internet gaming websites that provide a forum in cyberspace for virtual competitive play, and the like.

Currently available fraud detection and notification services may be provided to the merchants as a subscription service by a network service provider that specializes in fraud detection. Such fraud detection and notification services may include validating and authorizing credit card transactions, and/or providing other forms of fraud protection and/or prevention. For example, services are able that recognize and help merchants avoid network devices associated with a stolen credit card. Such services may help prevent the perpetrator using the stolen credit card from using hundreds of other stolen credit cards in transactions with the merchants who subscribe to the service.

Although existing approaches to detecting e-commerce fraud are often targeted toward deterring a merchant from doing business with an e-commerce entity likely engaged in fraud, existing approaches to detecting e-commerce fraud do not leverage shared data. Further, many existing approaches have one or more of the following limitations. First, many fraud detection system produce "false negatives," in which risky transactions go unnoticed by the fraud detection systems. False negatives may occur if a returning network device is unidentifiable because one or more of its device identifiers have been deleted, or because the network device is attempting to "cloak" itself by using, for example, an anonymous proxy to access a network service provider (e.g., a website). Second, when the merchant does not have an actual or "real" device identifier associated with a particular network device, the fraud detection system may not provide sufficient information to the merchant for assessing the risk of transacting business with that particular network device. Third, the network device reputations determined by the fraud detection system alone may include insufficient information to aid the merchant's decision making because sometimes additional data is needed to identify fraudulent transactions. Finally, the fraud detection system must have an established device-account association to make a valid association between the network devices and/or between customer accounts.

The present application addresses these limitations and provides other advantages as will be apparent from the following detailed description and accompanying figures.

BRIEF DESCRIPTION OF THE SEVERAL VIEWS OF THE DRAWING(S)

FIG. 3 is a flow diagram of a method performed by the fraud detection service provider of FIG. 1.

FIG. 4 is a flow diagram of a method performed by a risk module of the fraud detection service provider of FIG. 1.

DETAILED DESCRIPTION OF THE INVENTION

Overview

Figure 1:
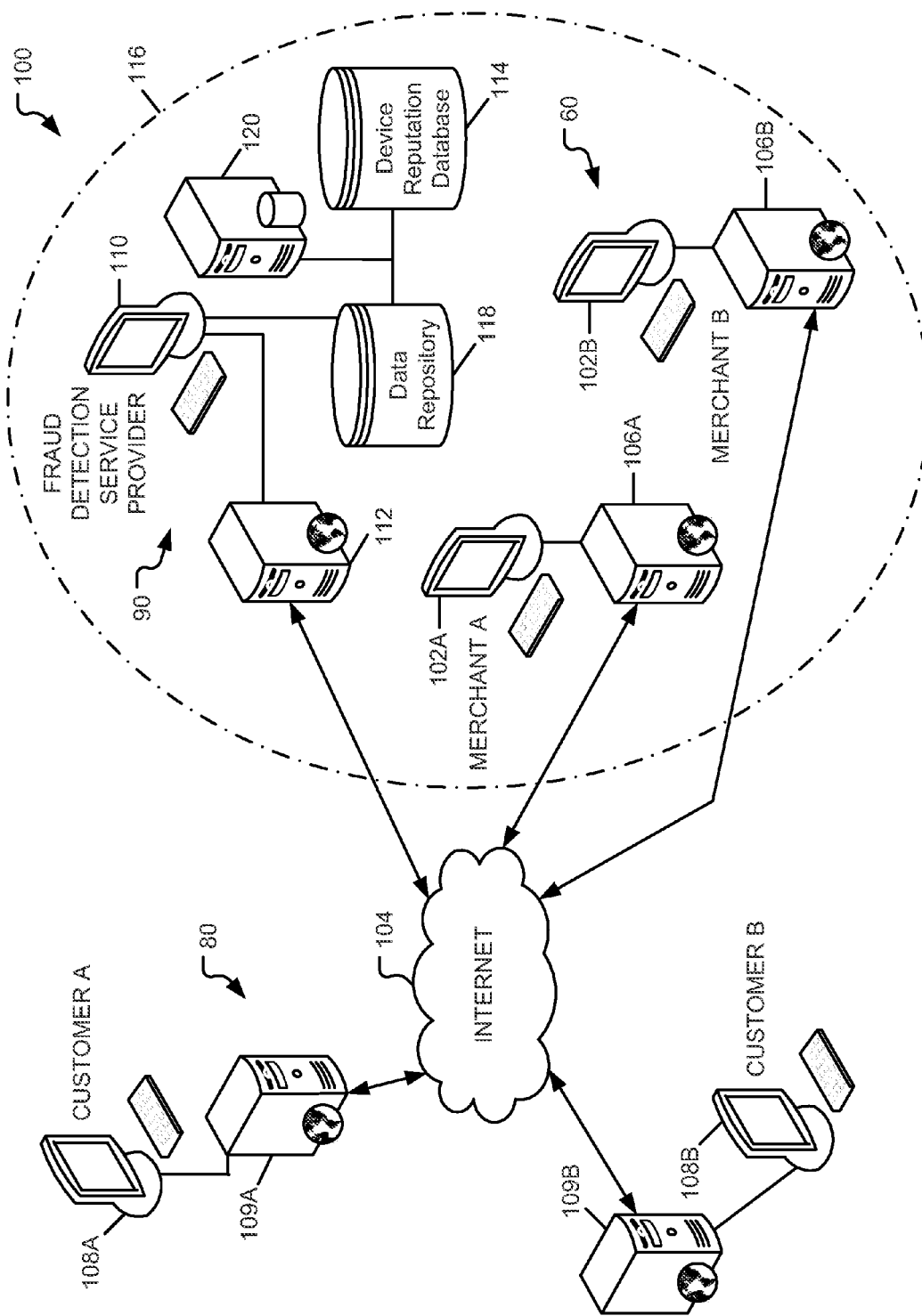
FIG. 1 is a block diagram of an e-commerce system including network devices operated by merchants, customers, and a fraud detection service provider, and connected to a common communications network.

A new approach to e-commerce fraud detection features a subscription service in which a fraud detection service provider gathers information about network devices operated by customers from members of a community of merchant subscribers, identifies those network devices that have been used in fraudulent transactions with the merchant subscribers, and associates a negative device reputation with each network device identified and characteristics associated with the network device. Thus, the negative device reputation may be characterized as being fact-based. Whenever a customer wishes to conduct a transaction with a selected one of the community of merchant subscribers, the selected merchant sends transaction data to the fraud detection service provider who computes a Composite Risk Score for the transaction and provides the Composite Risk Score to the selected merchant. The selected merchant may then use the Composite Risk Score to decide whether to proceed with the transaction. The information gathered and negative device reputations are shared within the community for the mutual benefit of the merchant subscribers. Optionally, the selected merchant may use this shared information in addition to the Composite Risk Score when deciding whether to proceed with the transaction. Because this approach to e-commerce fraud detection is fact-based, and cross-checks information provided by the community of merchant subscribers, the approach may provide highly accurate network device recognition.

Furthermore, the approach may address at least some of the limitations of prior art fraud detection systems. For example, as will be discussed below, the new approach does not use an actual or "real" device identifier of the network device operated by customer conducting the transaction. In other words, the transaction is evaluated as if it were being conducted by an unidentified network device. Therefore, the new approach avoids the problem of "false negatives" caused by missing or modified network device identifiers present in many prior art fraud detection systems. For the same reason, the new approach also avoids the limitations of prior art systems that require that the merchant have the "real" device identifier of the network device operated by customer. Further, by sharing the information gathered and negative device reputations within the community for the mutual benefit of the merchant subscribers, the new approach avoids the limitation of prior art fraud detection systems that provide only a network device reputation to their subscribers. As mentioned above, network device reputations alone may include insufficient information because sometimes additional data is needed to flag transactions and aid in decision making by merchant subscribers. Thus, the new approach allows the merchants to obtain the additional data needed in their decision making processes. The new approach avoids the need to establish a device-account association for the purposes of making a valid association between network devices or between customer accounts.

As mentioned above, the present approach identifies and quantifies risks for transactions in which the identity of the network device operated by a customer remains unknown. This eliminates the need for merchant subscribers to provide device identifiers. Instead of using device identifiers, the present approach may use existing data to form a device reputation, without additional input data from the customer. The present approach is probability-based rather than strictly fact-based and computes two types of risk factors from the information gathered from the members of the community of merchant subscribers: (1) profile-based risk factors; and (2) transaction-based risk factors. The profile-based risk factors are used to determine a Profile-Based Risk Score and the transaction-based risk factors are used to determine a Transaction-Based Risk Score. Then, the Profile-Based Risk Score and the Transaction-Based Risk Score are combined to produce the Composite Risk Score that is used by the selected merchant to evaluate the risk of proceeding with the transaction.

System

FIG. 1 is a diagram of an e-commerce system 100 including hardware components operated by merchants 60 (e.g., merchants A and B), customers 80 (e.g., customers A and B), and a fraud detection service provider 90 ("FDSP"). Together the merchants 60 form a community of e-commerce merchants. Each of the merchants 60 operates a merchant subscriber device connected to a communications network 104 (typically the Internet) via a merchant network server. In the embodiment illustrated, the merchant A operates a merchant subscriber device 102A connected to the communications network 104 via a merchant network server 106A and the merchant B operates a merchant subscriber device 102B connected to the communications network 104 via a merchant network server 106B. While in FIG. 1 the community of e-commerce merchants is illustrated as including only two merchants (namely, merchants A and B), those of ordinary skill in the art appreciate that the community of e-commerce merchants may include any number of merchants.

Each of the customers 80 operates a customer device connected to the communications network 104 via an Internet service provider ("ISP") network server that is typically provided by a commercial ISP such as Verizon, Comcast, and the like. In the embodiment illustrated, the customer A operates a customer device 108A connected to the communications network 104 via an ISP network server 109A and the customer B operates a customer device 108B connected to the communications network 104 via an ISP network server 109B. While in FIG. 1 the system 100 is illustrated as including only two customers (namely, customers A and B), those of ordinary skill in the art appreciate that the system 100 may include any number of customers. Each of the customers 80 may be an individual, a business, an educational institution, or any other entity desiring to enter into an electronic business transaction with one or more of the merchants 60.

The FDSP 90 operates a FDSP device 110 connected to the communications network 104 via an FDSP network server 112, such as the Reputation Manager™ Simple Object Access Protocol ("SOAP") server available from iovation Inc. of Portland, Oreg. The network servers 106A, 106B, 109A, 109B, and 112 may each supply a hard-wired connection, or a wireless connection to the communications network 104 allowing the devices 102A, 102B, 108A, 108B, and 110, respectively, to be wireless and/or mobile.

The merchants 80 each subscribe to fraud detection services provided by the FDSP 90 and form a subscriber community 116 therewith. The merchants 60 report transaction data to the FDSP 90, which stores the data in a data repository 118. The FDSP 90 maintains a device reputation database 114 configured to access the transaction data stored in the data repository 118 and generate a reputation for each of the customer devices 108A and 108B based on a transaction history (collected in the data repository 118) associated with the customer device. Thus, the device reputation database 114 stores data representing a reputation for each of the customer devices 108A and 108B. The reputation of a particular customer device is typically based, at least in part, on the transaction data reported by the merchants 60 within the subscriber community 116 that have conducted transactions in the past with the particular customer device. In the data repository 118, the reputation of each of the customer devices 108A and 108B is associated with characteristics (described below) that are associated with the customer device and used to calculate the profile-based risk factors and transaction-based risk factors.

Methods of determining a device reputation based on a transaction history associated with a customer device are known in the art and will not be described in detail. For example, U.S. patent application Ser. No. 11/058,846, filed on Feb. 15, 2005, titled Network Security and Fraud Detection System and Method describes one or more methods that may be used. By way of a non-limiting example, the device reputation database 114 may be implemented using a Reputation Manager™ online transaction processing ("OLTP") Oracle database available from iovation Inc. of Portland, Oreg.

As is apparent to those of ordinary skill in the art, the FDSP 90 may attempt to identify each of the customer devices 108A and 108B using a unique device identifier. For example, the FDSP 90 may aggregate a number of device properties to create a device fingerprint that is used as a device identifier. Alternatively, the FDSP 90 may simply assign a unique device identifier to each customer device. Methods of assigning unique device identifiers to network devices are known in the art and will not be described in detail. However, because the configurations of the customer devices 108A and 108B may change over time and/or the customer devices 108A and 108B may intentionally try to hide or cloak their identity, the data repository 118 may include more than one unique device identifier for each of the customer devices 108A and 108B. Nevertheless, the reputation determined for each unique device identifier will be associated with the characteristics associated with the customer device that was associated with the unique device identifier. In this manner, the reputation associated with a particular unique device identifier is also associated with at least one characteristic (e.g., an IP address) that is also associated with or shared by other customer devices.

Occasionally, the device reputation database 114 updates the data repository 118 with the reputations generated for the customer devices 108A and 108B operated by the customers 80 ("reputation data"). The data repository 118 is configured to supply the transaction and reputation data to a risk module 120 for use in computing the statistics used to calculate the Profile-Based Risk Score, Transaction-Based Risk Score, and Composite Risk Score for one or more transactions of interest. By way of a non-limiting example, the device reputation database 114 may update the data repository 118 with the reputation data periodically (e.g., hourly). Thus, the reputation data stored by the data repository 118 may be identical to the reputation data stored by the device reputation database 114. In this manner, the data repository 118 provides a separate computing environment from the device reputation environment so that risk scoring may be offered to the merchants 60 as a separate, add-on subscription service. Some of the merchants 60 may maintain a limited subscription to the device reputation database 114, while others may also have access to the risk module 120.

The risk module 120 contains processing hardware and software for computing profiles and risks for specific transactions. In particular embodiments, this computational component may be implemented in a procedural programming language, such as Oracle Procedural Language/Structured Query Language ("PL/SQL").

Figure 2:
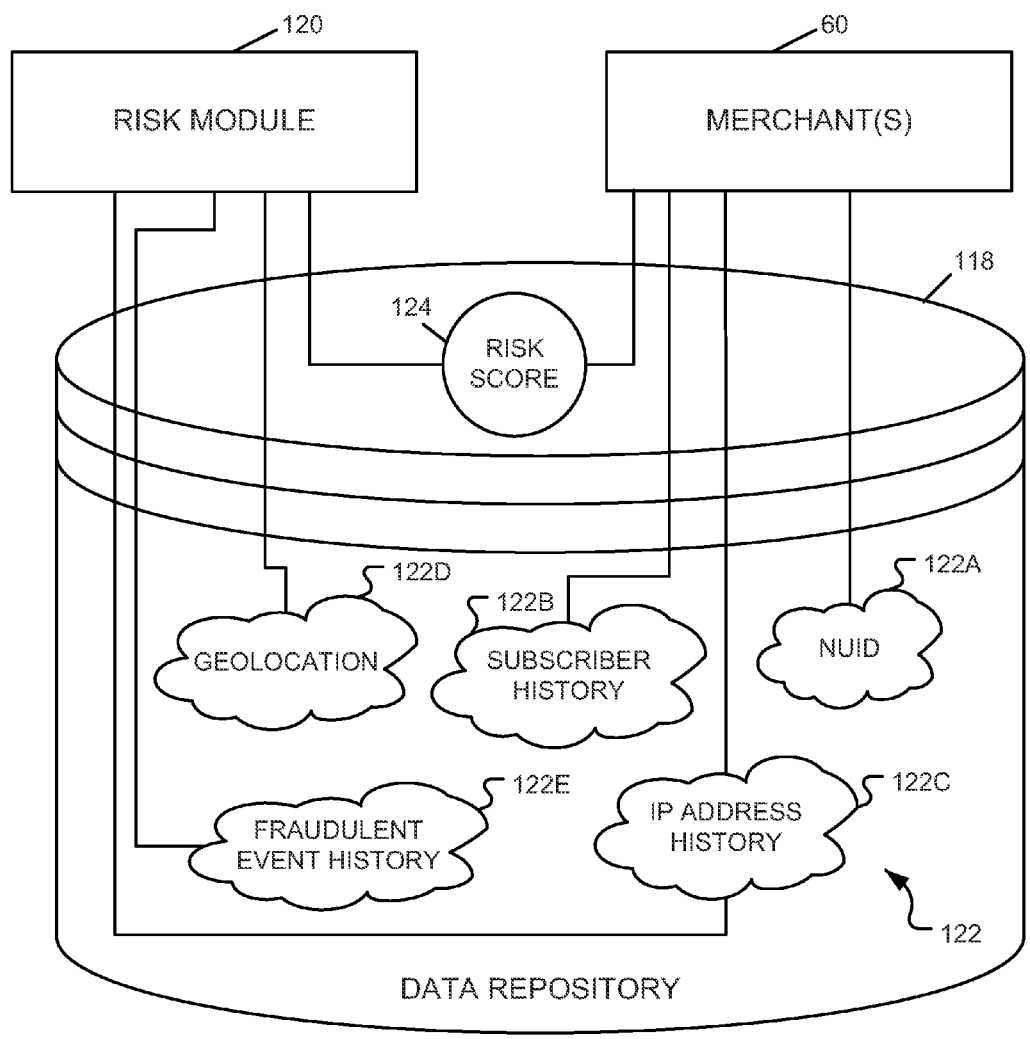
FIG. 2 is a block diagram illustrating the flow of data into and out of a data repository of the fraud detection service provider shared by the merchant of FIG. 1.

FIG. 2 illustrates the flow of data to and from the data repository 118. One or more of the merchants 60 within the subscriber community 116 (see FIG. 1) access the data repository 118, via user interface protocols established by the FDSP 90 (see FIG. 1), to report transaction data (which may include evidence of fraud) for storage in the data repository 118. An example of such a user interface is a standard Java-based network application that uses JavaServer Pages ("JSP"), session beans, and a Java Database Connectivity ("JDBC") database connection pool. The transaction data may include "hard" evidence and/or "soft evidence" (described below) that the transaction involved fraud. Such evidence is used to determine a reputation for the customer device that conducted each transaction. As mentioned above, in the data depository 118, the reputation of the customer device is associated with characteristics associated with the customer device and used to calculate both the profile-based risk factors and transaction-based risk factors. Therefore, the reputation assigned to one of the customer devices many be used with respect to any of the customer devices having one or more of characteristics in common. Further, the reputation assigned to one of the customer devices many be used with respect to a new customer device that has not previously conducted a transaction with one of the merchants 60 provided the new customer device has one or more of characteristics in common with one of the customer devices 108A and 108B.

The data repository 118 stores the transaction data in one or more data objects 122. In the embodiment illustrated in FIG. 2, the transaction data is stored in a Non-Unique Identifier ("NUID") data object 122A, a subscriber history data object 122B, an IP address history data object 122C, a geolocation data object 122D, and a fraudulent event history data object 122E. The NUID data object 122A stores at least one non-unique identifier (e.g., an Operating System version, a Browser version, a plug-in identifier, a hard drive serial number, a combination thereof, and the like) for each of the customer devices 108A and 108B (optionally identified by a unique device identifier) that conducted a transaction with one of the merchant subscriber devices 102A and 102B. Each of the NUIDs identified by the device reputation database 114 as having been involved in a fraudulent and/or abusive transaction is associated with a negative reputation. The IP address history data object 122C stores each IP address used by the customer devices 108A and 108B that conducted a transaction with one of the merchant subscriber devices 102A and 102B and associates each IP address with the NUIDs involved in the transaction and stored in the NUID data object 122A. Similarly, the geolocation data object 122D stores geolocation data associated with the customer devices 108A and 108B that conducted a transaction with one of the merchant subscriber devices 102A and 102B and associates the geolocation data with the NUIDs involved in the transaction and stored in the NUID data object 122A. The fraudulent event history data object 122E may store the evidence of fraud reported by the merchants 60 and associate the evidence with the NUIDs involved in the transaction and stored in the NUID data object 122A.

As is apparent to those of ordinary skill in the art, the data repository 118 may store data objects in addition to those illustrated in FIG. 2. For example, the data repository 118 may store a data object for each of the characteristics (described below) used to construct a profile. By way of another non-limiting example, the data repository 118 may store a data object for each of the characteristics (described below) used to determine the transaction-based risk factors.

The risk module 120 accesses the data objects 122 within the data repository 118 and computes, from attributes associated with the data objects 122, a Composite Risk Score 124 according to a risk scoring model described below. The one or more merchants 60 may query historical transactions made with potentially risky parties to investigate details about the transactions and the associated risks of engaging in a current transaction with the suspect party.

FIG. 3 is a flow diagram of a method 130 performed by the FDSP 90 of the system 100. In first block 131, the FDSP device 110 receives transaction data reported by one or more of the merchant subscriber devices 102A and 102B over the communications network 104 and stores the reported transaction data in the data repository 118. For each transaction reported, the reported transaction data indicates whether the transaction involved fraud. In next block 132, the device reputation database 114 analyzes the reported transaction data and identifies the NUIDs provided by customer devices used for fraudulent transactions. Then, in block 133, the device reputation database 114 associates a negative reputation with each of the customer devices used for fraudulent transactions and the NUIDs provided by such customer devices. Then, the method 130 terminates. As mentioned above, the negative reputation associated with each of the NUIDs identified in block 132 may be stored in the data repository 118.

FIG. 4 is a flow diagram of a method 134 performed by the risk module 120 of the system 100. In first block 135, the risk module 120 receives transaction data related to a transaction of interest from one of the merchant subscriber devices 102A and 1028 over the communications network 104. For ease of illustration, in this example, the risk module 120 received the transaction data from the merchant subscriber device 102A. In block 136, the risk module 120 calculates a Composite Risk Score for the transaction of interest using the transaction data. Then, in block 137, the risk module 120 provides the Composite Risk Score to the merchant subscriber devices 102A from which the risk module 120 received the transaction data. Optionally, the risk module 120 may store the Composite Risk Score in the data repository 118. Then, the method 130 terminates.

Figure 5:
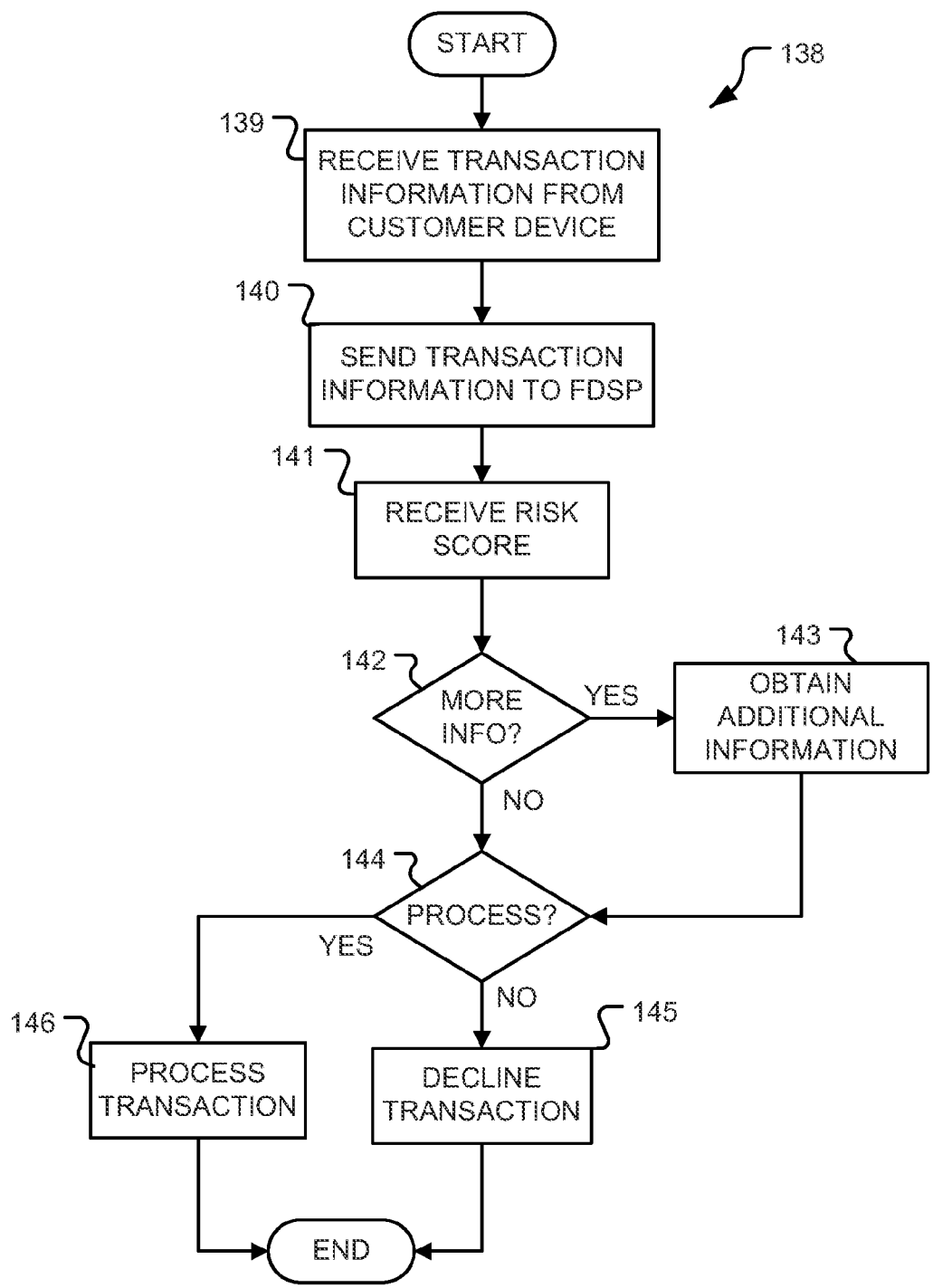
FIG. 5 is a flow diagram of a method performed by a merchant subscriber device operated by one of the merchants of FIG. 1.

FIG. 5 is a flow diagram of a method 138 performed by one of the merchant subscriber devices 102A and 102B. For ease of illustration, in this example, the method 138 will be described as being performed by the merchant subscriber device 102A. In first block 139, the merchant subscriber device 102A receives transaction data related to a transaction of interest from one of the customer devices 108A and 108B. For ease of illustration, in this example, the merchant subscriber device 102A received the transaction data from the customer device 108A.

Then, in block 140, the merchant subscriber device 102A sends the transaction data related to the transaction of interest to the risk module 120. In block 141, the merchant subscriber device 102A receives the Composite Risk Score from the risk module 120.

In decision block 144, the merchant subscriber device 102A decides whether to obtain additional information from the data repository 118. If the merchant subscriber device 102A determines it needs more information than the Composite Risk Score to decide whether to proceed with the transaction of interest, the decision in decision block 142 is "YES." On the other hand, if the merchant subscriber device 102A determines it does not need information beyond the Composite Risk Score to decide whether to proceed with the transaction of interest, the decision in decision block 142 is "NO."

When the decision in decision block 142 is "YES," in block 143, the merchant subscriber device 102A obtains additional information from the data repository 118. Then, the merchant subscriber device 102A advances to decision block 144.

When the decision in decision block 142 is "NO," the merchant subscriber device 102A advances to decision block 144.

In decision block 144, the merchant subscriber device 102A decides whether to proceed with the transaction. The decision in decision block 144 is based at least in part on the Composite Risk Score. Further, the decision in decision block 144 may be based at least in part on additional information obtained from the data depository 118 in block 143. If the Composite Risk Score indicates a high risk of fraud or abuse is associated with the transaction of interest, the decision in decision block 144 may be "NO" and in block 145, the merchant subscriber devices 102A may decline the transaction. Then, the method 138 terminates. On the other hand, if the Composite Risk Score indicates a low risk of fraud or abuse is associated with the transaction of interest, the decision in decision block 144 may be "YES" and in block 146, the merchant subscriber devices 102A may process the transaction. The merchant subscriber device 102A may use a threshold value to determine whether the Composite Risk Score indicates a high risk of fraud or abuse. Then, the method 138 terminates.

Figure 6:
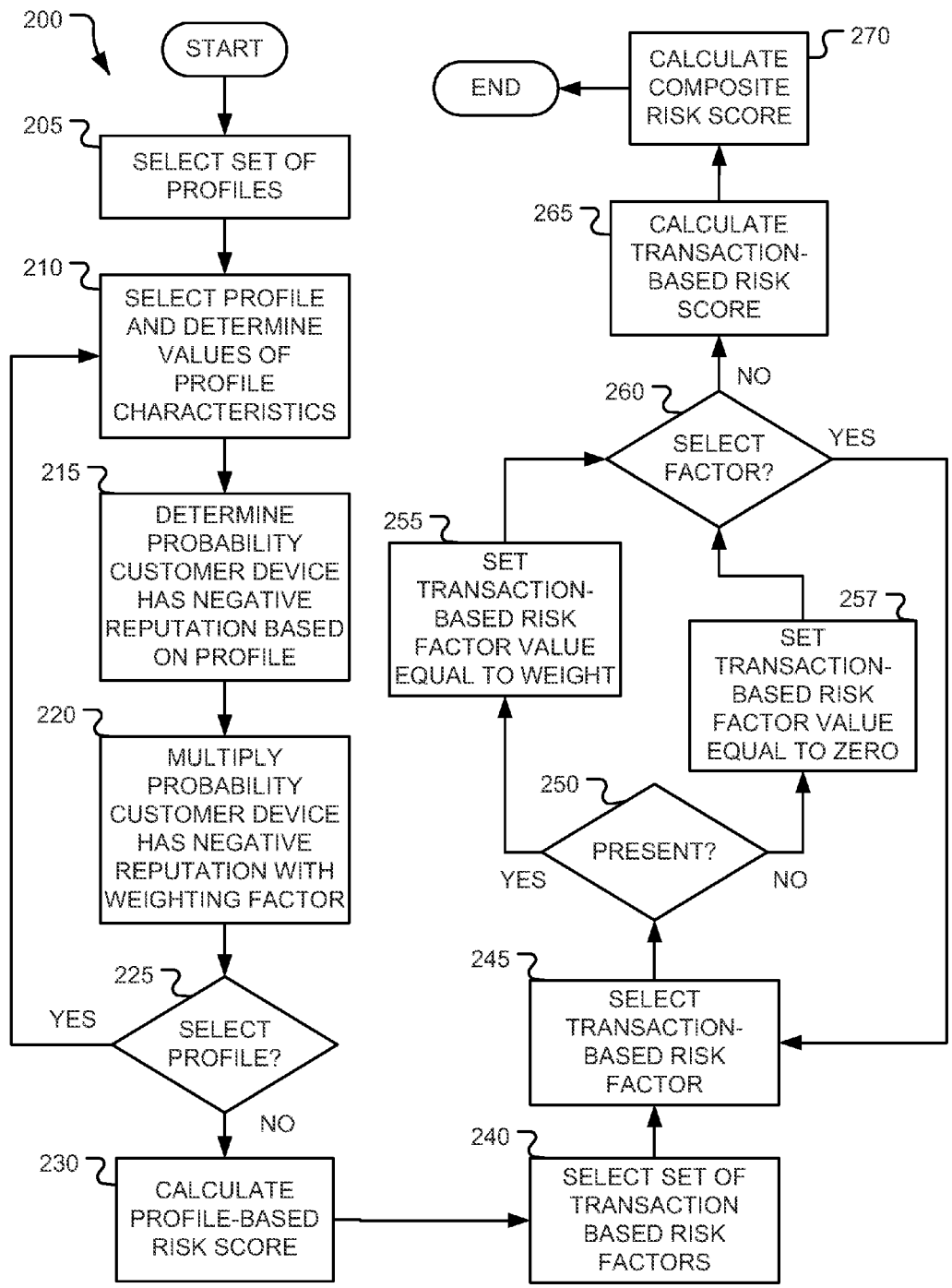
FIG. 6 is a flow diagram of a method performed by the risk module of the fraud detection service provider of FIG. 1.

FIG. 6 is a flow diagram of a method 200 that may be performed by the risk module 120 in block 136 of the method 134 illustrated in FIG. 4. The method 200 may be characterized as implementing an exemplary risk-scoring model. The risk module 120 may have a plug-in architecture supporting multiple risk indicators that are codified, for purposes of computation, as risk factors. These risk indicators may change over time, and they may be added to, or deleted from, the model. As mentioned above, the risk factors are divided into two types: (1) profile-based risk factors; and (2) transaction-based risk factors.

The profile-based risk factors are used to calculate the Profile-Based Risk Score and the transaction-based risk factors are used to calculate the Transaction-Based Risk Score which are combined (e.g., summed) to produce the Composite Risk Score.

Profile-Based Risk Factors

A "profile" describes a group of devices that share one or more common characteristics. In the example provided below, the profile-based risk factors are determined using a Bayesian model by computing a probability based on the percentage of the network devices in a profile that are known to be associated with negative evidence (i.e., evidence of fraudulent activity) and therefore are associated with negative reputations. The characteristics used to define a profile may include one or more device properties (e.g., a NUID), a geographic location ("geolocation"), one or more merchant subscriber properties (e.g., a merchant identifier), an Internet Protocol ("IP") address, an account identifier, a country, a language, and the like. The one or more device properties may include an operating system type, an Internet browser type, identifiers of plug-ins installed in the Internet browser, fonts installed on the customer device, an Internet browser identifier, a serial number of a hard drives, an operating system identifier, and the like. The geolocation may be a location identified using an IP address. By way of another non-limiting example, the geolocation may be provided by Global Positioning Systems ("GPS") incorporated into the customer devices 108A and 108B, or other sources of geolocation information. The geolocation may include a country, region, city, latitude, longitude, and/or ZIP code identified using an IP address. The characteristics may include other attributes and properties associated with the customer devices 108A and 108B, such as web analytics (e.g., a browser language, a screen resolution, a browser name, etc.). The method 200 is not limited to use with any particular set of characteristics or profiles.

As discussed above, the FDSP 90 determines a reputation for each customer device and any NUID associated therewith (which is stored in the device reputation database 114 and the data repository 118 as "reputation data") based on transaction data reported to the data repository 118 by the merchants 60. Each of the customer devices 108A and 108B may be associated with one or more of the NUIDs. However, with respect to a particular transaction of interest, the merchant 60 conducting the transaction and FDSP 90 may be unable to associate the customer device wishing to conduct the transaction with a particular NUID used previously by the customer device because the NUID may have changed, or been deleted. Further, the customer device may be attempting to "cloak" itself by using, for example, an anonymous proxy to access the merchant conducting the transaction. In other words, the merchant conducting the transaction and FDSP 90 may not know the actual or "real" device identifier and/or one or more of the NUIDs of the customer device. Thus, the merchant cannot reliably determine the reputation of the customer device attempting to conduct the transaction of interest. In such circumstances, a Profile-Based Risk Score may be calculated for a transaction of interest using one or more profiles to which the customer device belongs. Membership in a profile is determined using characteristics supplied by the customer device and/or the customer attempting to conduct the transaction of interest.

Examples of profiles used in the risk-scoring model may include the following:

1) a device property/properties and geolocation profile;

2) a subscriber property/properties, device property/properties, and geolocation profile;
3) an IP address profile;
4) a subscriber property/properties, country, and language profile; and
5) an account profile.

Thus, when a particular one of the customer devices 108A and 108B uses an IP address that was also used by a different one of the customer devices, the likelihood that the particular customer device is engaged in fraudulent activities may be determined at least in part using the IP address profile, which includes the reputation of the different one of the customer devices.

As will be described below, each of the profiles is used to calculate a profile-based risk factor. The profile-based risk factors for the profiles are then combined to determine the Profile-Based Risk Score.

From a machine intelligence standpoint, a profile-based risk model may be implemented as a pure Bayesian model. According to a Bayesian model, probabilities are computed based on previously collected data, and those probabilities are used to predict the likelihood of risk that a current transaction is fraudulent.

Turning to FIG. 6, the method 200 may be performed by the risk module 120. The method 200 determines a risk that a transaction of interest involving an unidentified customer device is fraudulent. For ease of illustration, the transaction of interest will be described as being conducted between the merchant subscriber device 102A and the customer device 108A (see FIG. 1). In first block 205, the risk module 120 selects a set of relevant profiles. For ease of illustration, the present example will include four of the five profiles listed above (namely, the first four profiles listed above).

In next block 210, the risk module 120 selects one of the profiles from the set selected in block 205 and determines the value of each of the characteristics of the selected profile based on the transaction data provided to the risk module 120 by the merchant subscriber device 102A. By way of an example, when the IP address profile is selected in block 210, an IP address (e.g., "80.90.160.194") supplied to the merchant subscriber device 102A by the customer device 108A (see FIG. 1) may be identified in block 210.

In block 215, the risk module 120 determines a probability that the customer device 108A conducting the transaction of interest has a negative reputation based on the profile selected in block 210. When the IP address profile is being evaluated, in block 215, a probability that the IP address identified in block 210 is associated with fraudulent activity is calculated. For example, the IP address profile may indicate within the past 50 days, 26 network devices were assigned the IP address, and 13 of the network devices having that IP address were associated with a negative reputation, according to information from at least one of the merchants 60 (see FIG. 1) within the subscriber community 116 (see FIG. 1). Thus, the IP address profile indicates there is a 50% probability that the transaction of interest is being conducted by a customer device associated with a negative reputation.

Then, in block 220, the risk module 120 applies a risk weighting factor. By way of a non-limiting example, the risk weighting factor may be an integer value between 0 and 100. The risk weighting factors may be specified by the merchants 60. Further, different merchants may specify different risk weighting factors. The risk weighting factor represents the importance of each profile with respect to the other profiles in the Profile-Based Risk Score. For example, if the risk weighting factor for the IP address profile is 30 and the risk weighting factor for the device property/properties and geolocation profile is 15, IP address information is considered to be twice as relevant as the device property/properties and geolocation information. In this example, the contribution of the IP address profile to the Profile-Based Risk Score will be twice that of the device property/properties and geolocation profile.

The following formula may be used to calculate the value of the profile-based risk factor ("PRF") for the profile selected in block 210:

PFR=(Probability of Negative Reputation)*(Risk Weighting Factor) Continuing the example from above, the value of the profile-based risk factor for the IP address profile is 15 (i.e., 30*50%=15).

In decision block 225, the risk module 120 decides whether to evaluate another profile. The decision in decision block 225 is "NO" when all of the profiles selected in block 205 have been evaluated. Otherwise, the decision in decision block 225 is "YES." When the decision in decision block 225 is "YES," the risk module 120 returns to block 210. In this manner, as shown in Table 1, the risk module 120 calculates each of the values of profile-based risk factors of the profiles selected in block 205 in a similar fashion.

TABLE 1

Calculation of profile-based risk factors

| Profile | Weighting Factor | Probability of Negative Reputation | Value of Profile-Based Risk Factor |
|---|---|---|---|
| IP address | 30 | 50% | 30 * 0.5 = 15 |
| subscriber property/properties, country, and language | 11 | 5.23% | 11 * 0.0523 = 0.6 |
| device property/properties and geolocation | 15 | 100% | 15 * 1.0 = 15 |
| a subscriber property/properties, device property/properties, and geolocation | 30 | 100% | 30 * 1.0 = 30 |
| Sum of Risk Factors | — | — | 60.6 |

When the decision in decision block 225 is "NO," the risk module 120 advances to block 230 to calculate the Profile-Based Risk Score. In block 230, the risk module 120 may calculate the Profile-Based Risk Score by summing of the values of the profile-based risk factors for the profiles selected in block 205 to obtain a sum of the Profile-Based Risk Factors (see Table 1). By way of a non-limiting example, the following formula may be used to calculate the Profile-Based Risk Score:

Profile-Based Risk Score=15*log(Sum of Risk Factors)$^2$

In the example provided in Table 1, the Profile-Based Risk Score calculated by the above formula is about 48 (i.e., $15*\log(60.6)^2 \approx 48$). In the formula, a universal constant scaling factor of 15 is used to place the resulting value of the Profile-Based Risk Score within a predetermined range of 0-100, while maintaining the integrity of their relative values. If the profile-based risk scoring method were to employ a linear sum of profile-based risk factors instead of a logarithmic sum, the Profile-Based Risk Scores may be skewed toward the high end of the scale when multiple profile-based risk factors are used to calculate the Profile-Based Risk Score. However, the logarithmic sum may be used to remedy this problem by evenly distributing the Profile-Based Risk Scores.

Transaction-Based Risk Factors

The transaction-based risk factors assess characteristics of a pending transaction associated with risk. Each of the transaction-based risk factors is associated with a weight determined based on how strongly the transaction-based risk factor is correlated with recently documented fraud and/or abuse. For example, transaction-based risk factors correlated or associated with fraud and/or abuse documented within the last 60 days may be associated with larger weight values than transaction-based risk factors correlated or associated with fraud and/or abuse documented earlier than the last 60 days.

The risk module 120 analyzes transactions and identifies transaction characteristics that indicate a transaction is likely to be fraudulent. For example, transactions may be identified as fraudulent if the risk module 120 detects the customer device conducted a large number of transactions (e.g., 50) within a relatively short period of time (e.g., within ten-minutes), or generated a large number of accounts (e.g., 100) in a rapid succession.

By way of a non-limiting example, each of the weights may be an integer between 0 and 100. The weights associated with the transaction-based risk factors are relative to one another. In other words, the weights may represent the importance of each transaction-based risk factor with respect to the other transaction-based risk factor in the Transaction-Based Risk Score. For example, if the presence of a first transaction-based risk factor indicates an 80% risk that the transaction is fraudulent (based on historical transaction data), and the presence of a second transaction-based risk factor indicates a 40% risk that the transaction is fraudulent (based on historical transaction data), the first transaction-based risk factor may be associated with a weight that is twice that associated with the second transaction-based risk factor.

The risk module 120 calculates the risk that the transaction is fraudulent based on the presence of a particular transaction-based risk factor using the reputations of the customer devices that conducted transactions with the merchants 60 in which the transaction-based risk factor was present. By way of a non-limiting example, the risk module 120 may determine 50 customer devices conducted transactions (e.g., within the last 60 days) involving a particular transaction-based risk factor (e.g., Virtual Machines) and 20 of those 50 customer devices were associated with a negative reputation. In this example, the risk that the transaction is fraudulent is about 40% (i.e., 20/50=0.4). Thus, unlike prior art methods, the present method uses device reputations to assess transaction-based risks. In this manner, the values of the transaction-based risk factors may also be characterized as being fact-based.

The weights associated with the transaction-based risk factors are also relative to the profile-based risk factors such that either the profile-based risk factors or the transaction-based risk factor may be given more weight in the Composite Risk Score.

In block 240, the risk module 120 selects a set of transaction-based risk factors. The set may be selected based at least in part on the type of transaction being conducted. By way of a non-limiting example, in block 240, the risk module 120 may select the following five transaction-based risk factors:
 a) transactions in which Javascript did not run on the customer device;
 b) transactions involving Virtual Machines;
 c) transactions in which an anonymous proxy was detected (e.g., using data from a MaxMind® IP database, available from MaxMind, Inc of Boston, Mass.);
 d) transactions in which a satellite connection was detected (e.g., using a MaxMind® IP database);
 e) transactions in which the time zone configuration setting within the customer's Internet browser does not match the time zone associated with the IP address of the customer device; and
 f) transactions in which the IP address provided by the customer device does not match the IP address computed by an application (e.g., a "Real IP" feature of the Reputation Manager application available from iovation Inc. of Portland, Oreg.) configured to identify an actual IP address of a client computing device on the Internet 104 even in cases where the customer device is intentionally obfuscating its IP address.

While examples of transaction-based risk factors are listed above, the method 200 is not limited to use with any particular set of transaction characteristics or transaction-based risk factors.

In block 245, the risk module 120 selects one of the transaction-based risk factor selected in block 240. By way of a non-limiting example, in block 245, the risk module 120 may select the "transactions involving Virtual Machines" transaction-based risk factor.

In decision block 250, the risk module 120 determines whether the selected transaction-based risk factor is present. If the selected transaction-based risk factors is present, there is at least some risk the transaction is fraudulent and the decision in decision block 250 is "YES." If the selected transaction-based risk factors is not present, the decision in decision block 250 is "NO."

When the decision in decision block 250 is "YES," in block 255, the risk module 120 sets the value of the selected transaction-based risk factor equal to the weight associated with the selected transaction-based risk factor. Then, the risk module 120 advances to decision block 260.

When the decision in decision block 250 is "NO," in block 257, the risk module 120 sets the value of the selected transaction-based risk factor equal to the zero. Then, the risk module 120 advances to decision block 260.

In decision block 260, the risk module 120 decides whether to evaluate another transaction-based risk factor. The decision in decision block 260 is "NO" when all of the transaction-based risk factor selected in block 240 have been evaluated. Otherwise, the decision in decision block 240 is "YES." When the decision in decision block 260 is "YES," the risk module 120 returns to block 245. In this manner, the risk module 120 calculates each of the values of transaction-based risk factors selected in block 240 in a similar fashion.

When the decision in decision block 260 is "NO," the risk module 120 advances to block 265 to calculate the Transaction-Based Risk Score. In block 265, the Transaction-Based Risk Score may be calculated by summing of the values of the transaction-based risk factors selected in block 240 to obtain a Sum of Transaction-Based Risk Factors. By way of a non-limiting example, the following formula may be used to calculate the Transaction-Based Risk Score:

$$\text{Transaction-Based Risk Score} = 15 * \log(\text{Sum of Transaction-Based Risk Factors})^2$$

Finally, in block 270, the Composite Risk Score is computed by combining the Transaction-Based Risk Score and the Profile-Based Risk Score. Then, the method 200 terminates.

Reputations

The use of actual fact-based evidence of fraud by the risk scoring model includes accumulating transaction data from the merchants 60 (e.g., in block 131 of the method 130 illustrated in FIG. 3). Evidence of fraud may include, for example, evidence of credit card fraud (in which a merchant lost money due to a customer's use of a stolen or fake credit card), evidence that a customer has been abusive to support (in which a merchant's customer threatened or harassed the merchant's customer support personnel), and evidence of inappropriate content (in which a customer uploaded inappropriate content, such as copyrighted material or pornography, to a merchant's website). Each of the above types of evidence may indicate that a customer is a higher-than-normal risk for fraudulent activity.

For purposes of aggregation, evidence may be categorized as "hard" evidence or "soft" evidence and assigned a value of a "severity" attribute. The severity attribute indicates to what degree the evidence is relevant in forming a crossover value that may be shared with other merchants in the subscriber community 116 (see FIG. 1). It is desirable to train the merchants 60 to use evidence types consistently, but, inevitably, variations may arise among the merchants. However, in general, "hard" evidence is evidence of an actual historical fraud or abuse event, whereas "soft" evidence includes suspicion of fraud or abuse. By way of an example, such suspicion may be based on a business rule. For example, a particular merchant may have a business rule that every account originating from Asia is to be flagged as "potential fraud." The flag may serve as a placeholder until a final decision is made with respect to the account.

When aggregating evidence for risk scoring, "hard" evidence may be aggregated and used with respect to all of the merchants 60. On the other hand, "soft" evidence may be used only with respect to the merchant who provided it. Furthermore, only "hard" evidence may be used when computing the profile-based risk factors.

Two sets of reputation tables may be used to manage device reputations. By way of a non-limiting example, the first set of tables may include reputation tables named "ACCOUNT_REPUTATION_STATUS" and "DEVICE_REPUTATION_STATUS" that represent or store trusted evidence (e.g., data). The second of tables may include tables named "ACCOUNT_REP" and "DEVICE_REP" that represent or store actual device reputations used to compute risk. Account reputations apply to any one of multiple accounts associated with a single device (i.e., when evidence of fraud is reported, a device associated with the fraudulent transaction is labeled with a device reputation) and in addition, all accounts known to have accessed that device are labeled with an account reputation.

The table named "DEVICE_REP" may be used to customize reputations for each of the merchants 60. For example, the table named "DEVICE_REP" may contain a subscriber code and a predetermined evidence severity value indicating a severity level above which the merchant would associate customer devices with a negative reputation. At risk assessment time, the predetermined evidence severity value associated with the subscriber code of the merchant requesting the Composite Risk Score is used to evaluate the evidence associated with each device in each of the profiles selected in block 205 of the method 200 illustrated in FIG. 6 to determine whether each device is (or is not) associated with a negative reputation.

The approach presented herein may offer several advantages over prior art fraud detection systems. For example, the present approach may be used to determine device reputations from data already gathered from the merchants 60 by the FDSP 90. No additional input data is needed to enable risk scoring. Further, the present approach may leverage accurate geolocation information, and recognize anonymous proxies and satellite Internet service providers.

Software implementations of the methods described above have been shown to effectively support fraud and abuse management even if a limited amount of transaction data is available (e.g., gathered in the data repository 118), provided the transaction data is recent (e.g., reported within about the last 60 days). Because computing devices and networks change over time, limiting the volume of transaction data used (e.g., to ensure the transaction data is current) may lower costs and produce better fraud and/or abuse detection tools. In a set of test cases that restricted the transaction data used to transaction data reported within the last 60 days, none of the test cases generated a Composite Risk Score that overlooked a risky transaction. In one case, a "steady state" of risk activity was achieved after only six days of data "trickled in" to the FDSP 90. These techniques also apply to other types of reporting that support active fraud management strategies.

In testing the present approach, it became apparent how accurate the various fraud indicators are at predicting actual fraud. When risky transactions were correlated with subsequent placement of evidence by subscribers, it was determined that the rate of evidence placement for those devices engaged in risky transactions was statistically higher than the rate of evidence placement for devices within the general device population.

The risk scoring method may include additional profile-based and transaction-based risk indicators than those described above. For example, personal computers that are (or are not) configured with a particular type of software (e.g., an enabled Flash player), may be correlated with a device reputation, and based on the strength of the correlation, this configuration may be added as a risk factor for certain transactions. It is possible to add new risk indicators to the model without skewing existing risk scores because all other risk factors remain unchanged.

Computing Device

Figure 7:
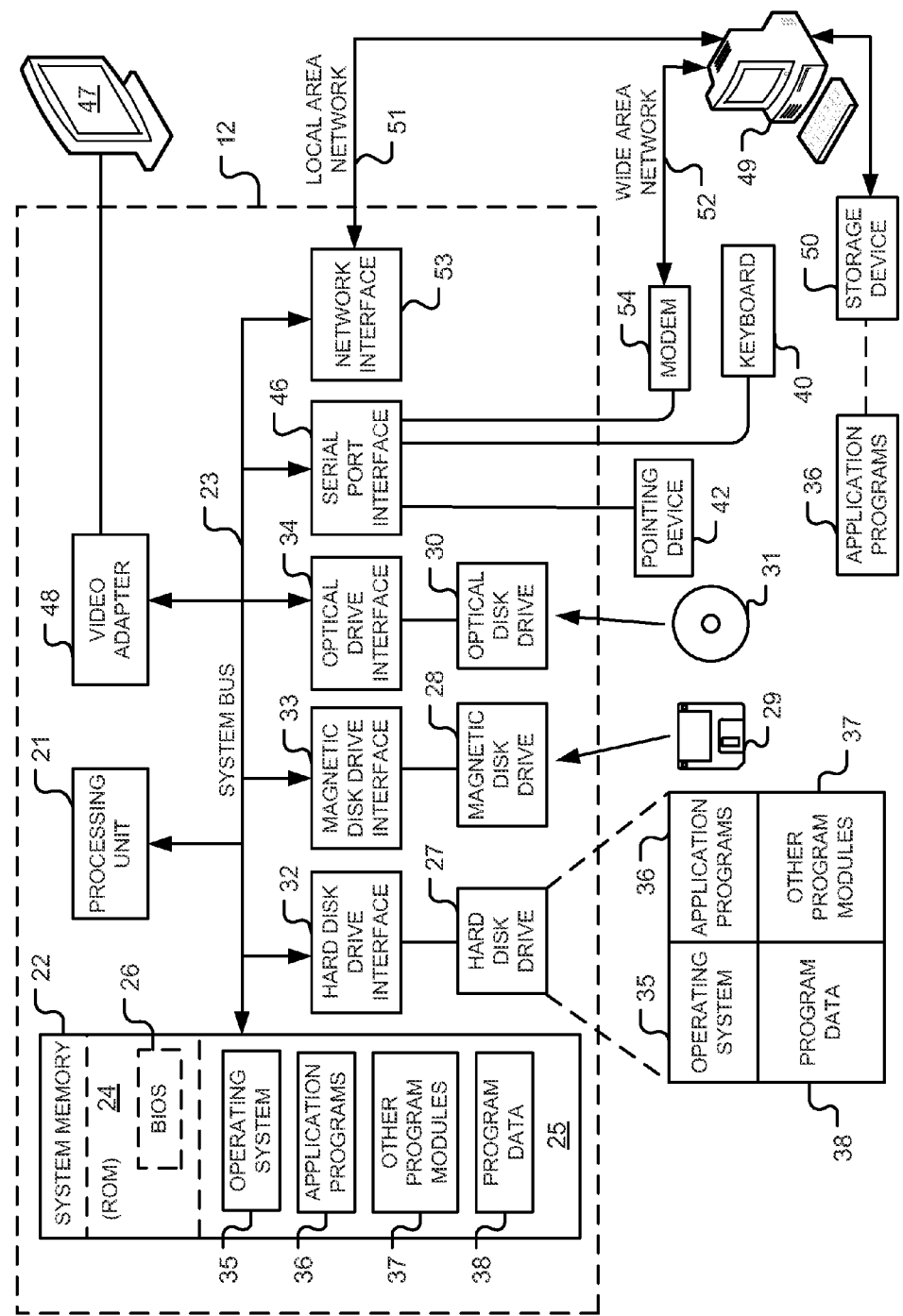
FIG. 7 is a diagram of a hardware environment and an operating environment in which one or more of the computing devices of the system of FIG. 1 may be implemented

FIG. 7 is a diagram of hardware and an operating environment in conjunction with which implementations of the system 100 and methods 130, 134, 138, and 200 may be practiced. The description of FIG. 7 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 7 includes a general-purpose computing device in the form of a computing device 12. Referring to FIG. 1, each of the merchant subscriber devices 102A and 102B, the merchant network servers 106A and 106B, the customer devices 108A and 108B, the ISP network servers 109A and 109B, the FDSP device 110, the FDSP network server 112, the device reputation database 114, the data repository 118, and the risk module 120, may be implemented using a computing device substantially similar to the computing device 12.

Returning to FIG. 7, the computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types physical feedback (e.g., a force feed back game controller).

The input devices described above are operable to receive user input and selections. Together the input and display devices may be described as providing a user interface. The input devices may be used to receive information from the merchants 60, the customers 80, and/or the FDSP 90. For example, the merchants 60 may use the input devices to enter evidence of fraud. The customers 80 may use the input devices to conduct transactions with the merchants 80. The user interface may be used to display the values of the profile-based risk factors, Profile-Based Risk Score, the values of the transaction-based risk factors, the Transaction-Based Risk Score, the Composite Risk Score, evidence of fraud, an indication that a transaction has been declined, and the like.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 7 include a local-area network (LAN) 51 and a wide-area network (WAN) 52. Such networking environments are commonplace in offices, enterprise-wide computer networks, intranets and the Internet. The network 104 (see FIG. 1) may be implemented using at least a portion of the networked environment described above.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The memories of the merchant subscriber devices 102A and 102B operated by the merchants 80 each store computer executable instructions that when executed by one or more processors cause the one or more processors to perform all or portions of the method 138 (see FIG. 5). Such instructions may be stored on one or more non-transitory computer-readable media.

The memory of the one or more computing devices implementing the risk module 120 operated by the FDSP 90 store processor executable instructions that when executed by one or more processors cause the one or more processors to perform all or portions of the methods 134 (see FIGS. 4), and 200 (see FIG. 6). Such instructions may be stored on one or more non-transitory computer-readable media.

The memory of the FDSP device 110 operated by the FDSP 90 stores processor executable instructions that when executed by one or more processors cause the one or more processors to perform all or portions of the method 130 (see FIG. 3). Such instructions may be stored on one or more non-transitory computer-readable media.

The memory of the device reputation database 114 operated by the FDSP 90 stores processor executable instructions that when executed by one or more processors cause the one or more processors to perform all or portions of the method 130 (see FIG. 3). Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for providing a risk score to at least one of a plurality of merchants to be used thereby to determine whether to proceed with a not yet completed transaction, the method comprising:
   storing, by one or more computing devices, transaction data related to a plurality of past transactions between a plurality of network devices and the plurality of merchants;
   identifying, by the one or more computing devices, as being fraudulent devices those of the plurality of network devices associated in the transaction data with fraudulent or abusive transactions;
   identifying, by the one or more computing devices, characteristics common to those of the plurality of network devices that have been identified as being fraudulent devices;
   constructing, by the one or more computing devices, a plurality of profiles based on the identified characteristics, wherein each of the profiles comprises one or more of the identified characteristics;
   receiving, by the one or more computing devices, new transaction data associated with the not yet completed transaction, wherein the new transaction data includes a value for each of the one or more identified characteristics of each of the plurality of profiles;
   identifying, by the one or more computing devices, those of the plurality of network devices that belong to each of the plurality of profiles, wherein, for each of the plurality of profiles, each of the plurality of network devices that belongs to the profile is associated with the value included in the new transaction data for each of the one or more identified characteristics of the profile;
   determining, by the one or more computing devices, a portion of those of the plurality of network devices that belong to each of the plurality of profiles that have been identified as being fraudulent devices;
   constructing, by the one or more computing devices, the risk score based at least in part on the portion of those of the plurality of network devices that belong to each of the profiles that have been identified as being fraudulent devices; and
   providing, by the one or more computing devices, the risk score to at least one of the plurality of merchants.

2. The method of claim 1, wherein the new transaction data associated with the not yet completed transaction is received from a merchant computing device operated by a particular one of the plurality of merchants, and providing the risk score to the at least one of the plurality of merchants further comprises:

transmitting, by the one or more computing devices, the risk score to the merchant computing device.

3. The method of claim 1, wherein the identified characteristics comprise at least one of: an Internet Protocol address, a device property, a geographic location, an account identifier, a country, and a language.

4. The method of claim 1, further comprising:
receiving a request from a merchant computing device operated by a particular one of the plurality of merchants for a portion of the transaction data; and
providing the portion of the transaction data to the merchant computing device in response to the request.

5. The method of claim 1, wherein a weighting factor is associated with each of the plurality of profiles, and
the risk score is further based at least in part on the weighting factor associated with each of the plurality of profiles.

6. The method of claim 5, wherein the new transaction data associated with the not yet completed transaction is received from a merchant computing device operated by a particular one of the plurality of merchants, wherein the weighting factor associated with each of the plurality of profiles is provided by the particular merchant, and wherein providing the risk score to the at least one of the plurality of merchants further comprises transmitting, by the one or more computing devices, the risk score to the merchant computing device.

7. The method of claim 5, further comprising:
obtaining a plurality of weighted profile-based risk factors by determining, by the one or more computing devices, a weighted profile-based risk factor for each of the plurality of profiles, wherein the weighted profile-based risk factor is determined for each of the plurality of profiles as a function of a weighting factor and the portion of those of the plurality of network devices that belong to the profile that have been identified as being fraudulent devices; and
obtaining a result value by totaling the plurality of weighted profile-based risk factors, wherein the risk score is constructed as a function of a product of a scaling factor and a square of a logarithm of the result value.

8. The method of claim 1, wherein the risk score is a profile-based risk score, wherein the new transaction data associated with the not yet completed transaction is received from a merchant computing device operated by a particular one of the plurality of merchants,
wherein providing the risk score to the at least one of the plurality of merchants further comprises transmitting, by the one or more computing devices, the risk score to the merchant computing device, and
wherein the method further comprises:
determining, by the one or more computing devices, a transaction-based risk score;
determining, by the one or more computing devices, a composite risk score as a function of the profile-based risk score, and the transaction-based risk score; and
transmitting, by the one or more computing devices, the composite risk score to the merchant computing device.

9. The method of claim 1, further comprising:
associating, by the one or more computing devices, a reputation with each of the plurality of network devices, the reputation associated with each network device in a negative portion of the plurality of network devices being negative, wherein those of the plurality of network devices identified as being fraudulent devices comprise the negative portion of the plurality of network devices.

10. The method of claim 1, wherein the transaction data stored by the one or more computing devices includes a device identifier uniquely identifying each of the plurality of network devices.

11. The method of claim 1, wherein the transaction data related to the plurality of past transactions was received by the one or more computing devices from the plurality of merchants fewer than a predetermined number of day ago.

12. The method of claim 1, wherein the new transaction data associated with the not yet completed transaction is received from a merchant computing device operated by a particular one of the plurality of merchants,
each of the plurality of network devices is an identified network device,
the not yet completed transaction is between an unidentified network device, and the particular merchant computing device, and
providing the risk score to the at least one of the plurality of merchants further comprises transmitting, by the one or more computing devices, the risk score to the merchant computing device.

13. A system for providing a risk score to at least one of a plurality of merchants to be used thereby to determine whether to proceed with a not yet completed transaction, the system comprising:
one or more data storage devices storing transaction data related to a plurality of past transactions between a plurality of network devices and the plurality of merchants; and
one or more computing devices connected to the one or more data storage devices, the one or more computing devices storing computer executable instructions, the one or more computing devices comprising one or more processors configured to execute the computer executable instructions, wherein when the one or more processors execute the computer executable instructions, the computer executable instructions cause the one or more computing devices to:
identify as being fraudulent devices those of the plurality of network devices associated in the transaction data with fraudulent or abusive transactions;
identify characteristics common to the identified fraudulent devices;
construct a plurality of profiles based on the identified characteristics, wherein each of the profiles comprises one or more of the identified characteristics;
receive new transaction data associated with the not yet completed transaction, wherein the new transaction data includes a value for each of the one or more identified characteristics of each of the plurality of profiles;
identify those of the plurality of network devices that belong to each of the plurality of profiles, wherein, for each of the plurality of profiles, each of the plurality of network devices that belongs to the profile is associated with the value included in the new transaction data for each of the one or more identified characteristics of the profile;
determine a portion of those of the plurality of network devices that belong to each of the plurality of profiles that have been identified as being fraudulent devices;
construct the risk score based at least in part on the portion of those of the plurality of network devices that belong to each of the profiles that have been identified as being fraudulent devices; and provide the risk score to at least one of the plurality of merchants.

14. The system of claim 13, wherein the new transaction data associated with the not yet completed transaction is received from a merchant computing device operated by a particular one of the plurality of merchants, and
the risk score is provided to the at least one of the plurality of merchants by transmitting the risk score to the merchant computing device.

15. The system of claim 13, wherein the identified characteristics comprise at least one of: an Internet Protocol address, a device property, a geographic location, an account identifier, a country, and a language.

16. The system of claim 13, wherein when the one or more processors execute the computer executable instructions, the computer executable instructions cause the one or more computing devices to:
receive a request from a merchant computing device operated by a particular one of the plurality of merchants for a portion of the transaction data; and
provide the portion of the transaction data to the merchant computing device in response to the request.

17. The system of claim 13, wherein a weighting factor is associated with each of the plurality of profiles, and the risk score is further based at least in part on the weighting factor associated with each of the plurality of profiles.

18. The system of claim 17, wherein the new transaction data associated with the not yet completed transaction is received from a merchant computing device operated by a particular one of the plurality of merchants,
wherein the weighting factor associated with each of the plurality of profiles is provided by the particular merchant, and
wherein the risk score is provided to the at least one of the plurality of merchants by transmitting the risk score to the merchant computing device.

19. The system of claim 17, wherein when the one or more processors execute the computer executable instructions, the computer executable instructions further cause the one or more computing devices to:
obtain a plurality of weighted profile-based risk factors by determining a weighted profile-based risk factor for each of the plurality of profiles, wherein the weighted profile-based risk factor is determined for each of the plurality of profiles as a function of a weighting factor and the portion of those of the plurality of network devices that belong to the profile that have been identified as being fraudulent devices; and
obtain a result value by totaling the plurality of weighted profile-based risk factors, wherein the risk score is constructed as a function of a product of a scaling factor and a square of a logarithm of the result value.

20. The system of claim 13, wherein the risk score is a profile-based risk score,
wherein the new transaction data associated with the not yet completed transaction is received from a merchant computing device operated by a particular one of the plurality of merchants,
wherein the risk score is provided to the at least one of the plurality of merchants by transmitting the risk score to the merchant computing device, and
wherein when the one or more processors execute the computer executable instructions, the computer executable instructions cause the one or more computing devices to:
determine a transaction-based risk score;
determine a composite risk score as a function of the profile-based risk score, and the transaction-based risk score; and
transmit the composite risk score to the merchant computing device.

21. The system of claim 13, wherein when the one or more processors execute the computer executable instructions, the computer executable instructions cause the one or more computing devices to:
associate a reputation with each of the plurality of network devices, the reputation associated with each network device in a negative portion of the plurality of network devices being negative, wherein those of the plurality of network devices identified as being fraudulent devices comprise the negative portion of the plurality of network devices.

22. The system of claim 13, wherein the transaction data stored by the one or more data storage devices includes a device identifier uniquely identifying each of the plurality of network devices.

23. The system of claim 13, wherein the transaction data related to the plurality of past transactions was received by the one or more computing devices from the plurality of merchants fewer than a predetermined number of day ago, and stored by the one or more computing devices in the one or more data storage devices.

24. The system of claim 13, wherein the new transaction data associated with the not yet completed transaction is received from a merchant computing device operated by a particular one of the plurality of merchants,
each of the plurality of network devices is an identified network device,
the not yet completed transaction is between an unidentified network device, and the particular merchant computing device, and
the risk score is provided to the at least one of the plurality of merchants by transmitting the risk score to the merchant computing device.

* * * * *